United States Patent [19]

Venturello et al.

[11] 4,369,663
[45] Jan. 25, 1983

[54] TRANSDUCER WITH SIX DEGREES OF FREEDOM

[75] Inventors: Giorgio Venturello; Osvaldo Salvatore, both of Turin, Italy

[73] Assignee: Centro Ricerche Fiat S.p.A., Turin, Italy

[21] Appl. No.: 231,065

[22] Filed: Feb. 3, 1981

[30] Foreign Application Priority Data

Mar. 7, 1980 [IT] Italy .............................. 67359 A/80

[51] Int. Cl.³ ............................................. G01L 5/16
[52] U.S. Cl. .................................. 73/862.04; 361/280; 361/290
[58] Field of Search ........... 73/862.04, 862.05, 862.06; 361/280, 283, 290, 292

[56] References Cited

U.S. PATENT DOCUMENTS

| | | | |
|---|---|---|---|
| 2,892,152 | 6/1959 | Buisson | 361/292 X |
| 3,109,984 | 11/1963 | Mehr | 361/290 X |
| 3,921,445 | 11/1975 | Hill et al. | 73/862.04 |
| 4,099,409 | 7/1978 | Edmond | 73/862.04 |

Primary Examiner—Charles A. Ruehl

Attorney, Agent, or Firm—Sughrue, Mion, Zinn, Macpeak & Seas

[57] ABSTRACT

A transducer having six degrees of freedom is provided for converting forces and moments applied to a movable member, particularly to the movable arm of a robot, into electrical signals. The transducer includes a cylindrical body which is intended to be connected to the movable member and whose lateral surface has two axially spaced portions each provided with four equiangularly spaced metal plates. A cylindrical casing is resiliently supported about the body and provided on its inner surface with two substantially semi-cylindrical metal plates arranged facing the plates carried by the body in such a way as to define therewith a narrow interspace and to constitute eight capacitors. The capacitances of these capacitors depend on the relative positions of the plates of the casing and the plates of the body. The transducer also includes detectors connected to the plates of the body and of the casing. The detectors are arranged to measure the capacitance of each of the capacitors and to provide, on the basis of this measurement, electrical signals indicative of the forces and the moments applied to the movable member.

8 Claims, 8 Drawing Figures

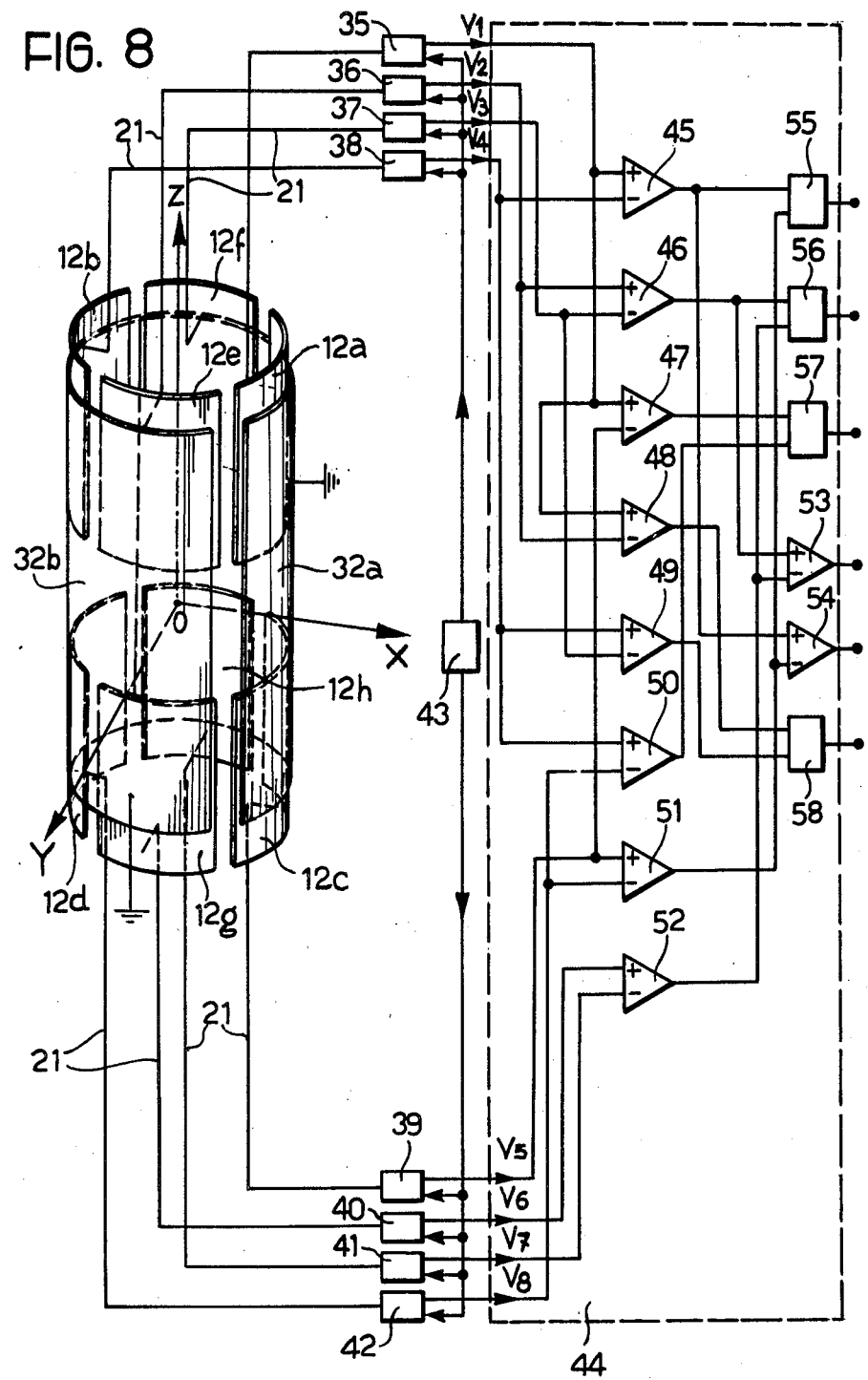

TRANSDUCER WITH SIX DEGREES OF FREEDOM

The present invention relates to a transducer having six degrees of freedom, for converting the forces and moments applied to a movable member, particularly to the movable arm of a robot, into electrical signals.

As is known, industrial robots are operating machines substantially constituted by at least one arm having one or more degrees of freedom, which arm, by means of a suitable "hand," is able to effect a wide variety of operations which are heavy or dangerous, or unpleasant for people to perform inasmuch as they are extremely repetitive.

The hand of the robot can, as required, be constituted by pincers, by a welding electrode, by a paint spray gun etc.

For convenient operation of a robot, it is necessary to be able to perform "teaching operations" (during which the central control unit of the robot "learns" a certain path through space which must subsequently be repeated) by dynamic use of the robot, without having to have recourse to a long and complicated static "point by point" teaching process, nor to the substitution of the arm of the robot with a light simulacrum, that is to say an arm connected only to the position transducers but not to the motors.

It is, moreover, necessary to make the robot sensitive to the stresses and to the reaction forces arising during the course of its working movements, that is to say it is necessary to have a sensitive "wrist" which, as well as transmitting the necessary forces for the movement of the workpieces, must be able to detect the reaction forces acting on the workpieces carried by the hand and exerted by the structure on which the said workpieces are to be assembled.

This sensitive "wrist," as well as detecting the said reaction forces, must be able to provide electrical signals for the control of the motors of the robot for the purpose of optimizing its movement.

To satisfy the above indicated requirements it is necessary to have available transducers with six degrees of freedom and high sensitivity, substantially devoid of mechanical hysteresis and able to provide output electrical signals indicative of the forces acting along each of the co-ordinate axes with negligible cross-"contamination" that is to say with negligible spurious components along the co-ordinate axes which are not of interest.

Transducers having six degrees of freedom and utilizing strain gauges are known. Such known devices have various disadvantages such as sensitivity to temperature variations and the necessity for complicated calibration operations. Moreover it is necessary to effect a preliminary study of the elastic and deformation characteristics of the structure on which the said devices are to be applied. Finally, the circuits for processing the signals provided by such devices are rather complicated and their general reliability is not always acceptable.

The object of the present invention is to provide a transducer having six degrees of freedom, of the type specified above, in which the above mentioned disadvantages are obviated. With a view to achieving this object, the present invention provides a transducer having six degrees of freedom for converting the forces and moments applied to a movable member, particularly to the movable arm of a robot, into electrical signals, the main characteristic of which lies in the fact that it comprises:

a rigid body of substantially cylindrical form intended to be connected to the said movable member and the lateral surface of which includes first and second axial portions each provided with four equiangularly spaced metal plates diametrically opposite one another in pairs; the generatrices of the said lateral surface which are tangential to each metal plate carried by the said first axial portion of the said surface being tangential to a corresponding plate carried by the said second axial portion;

a rigid casing having a substantially cylindrical inner surface which surrounds the said body; the said casing being resiliently suspended on the said body by means of resilient spacer means in such a way as to be able to perform limited displacements with six degrees of freedom with respect to the body; the inner surface of the casing being provided with two substantially semi-cylindrical metal plates, equiangularly spaced from one another and located facing the plates carried by the body in such a way as to define with these a narrow interspace and to constitute eight capacitors the capacitances of which depend on the relative positions between the plates of the casing and the plates of the body;

detector means connected to the plates of the body and to the plates of the casing to measure, during use, the instantaneous values of the capacitance of each of the said capacitors and to provide, on the basis of this measurement, electrical signals indicative of the forces and the moments applied to the said movable member.

Further characteristics and advantages of the invention will become apparent from the detailed description which follows, with reference to the annexed drawings, provided by way of non-limitative example, in which:

FIG. 8 is a schematic electric diagram of detector means constituting part of a device according to the invention.

Figure 1:
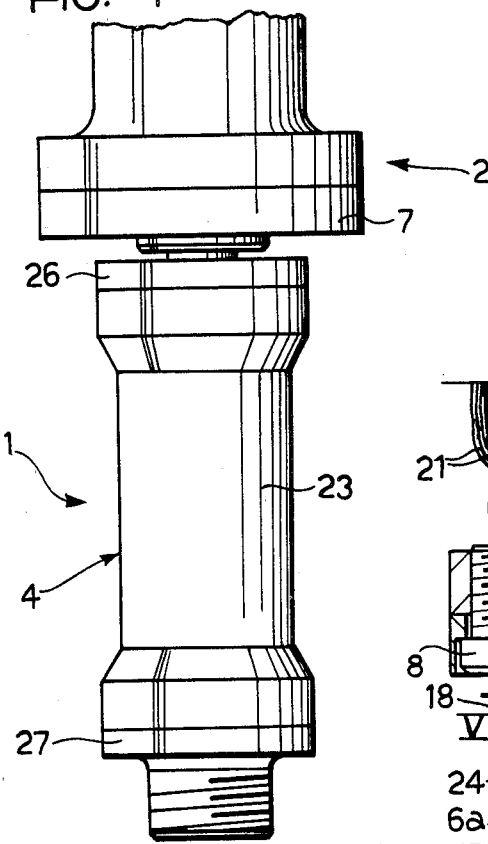
FIG. 1 is a perspective view of a transducer according to the present invention.

In FIG. 1 there is illustrated a transducer 1 which has six degrees of freedom and is connected at one end to a movable member 2 constituted, for example, by the movable arm of the robot.

Figure 2:
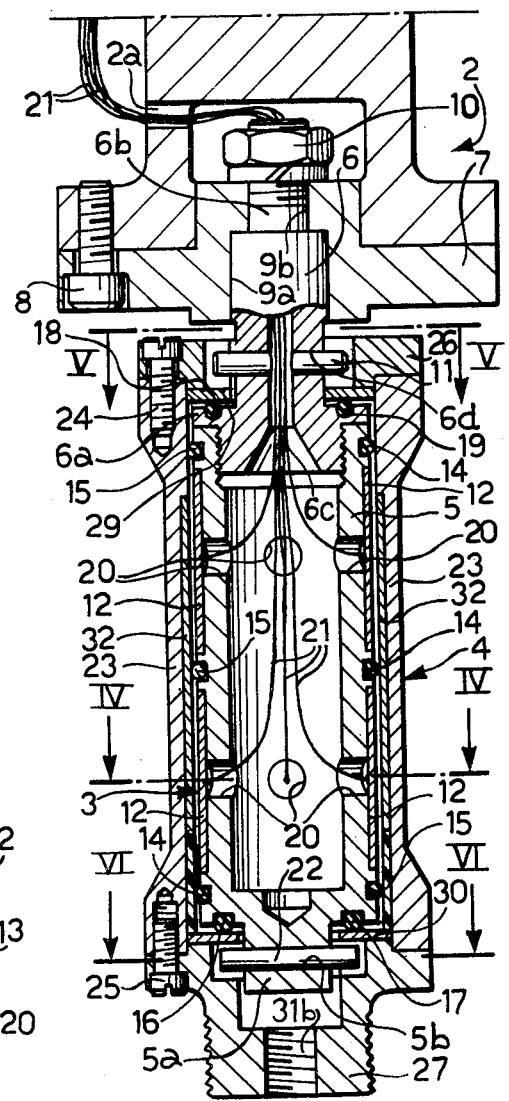
FIG. 2 is a longitudinal section taken on the line II—II of FIG. 1, on an enlarged scale.

As can be seen in FIG. 2, the transducer according to the invention comprises a rigid body 3 of substantially cylindrical form located within a rigid casing 4 having a substantially cylindrical inner surface.

The body 3 includes a hollow cylindrical element 5 the inner surface of which is threaded at the end facing towards the arm 2 of the robot.

A connection element for connecting the body 3 to the end of the arm 2 of the robot is indicated with the reference numeral 6. This connection element 6 is substantially cylindrical and the lower portion of its lateral surface is threaded and engages with the corresponding threaded portion of the hollow cylindrical element 5.

The connection element 6 is provided with an integral annular flange 6a which serves as an end stop for the upper edge of the hollow cylindrical element 3.

An annular element 7 is fixed to the end of the movable arm 2 by means of screws 8 and is provided with an axial cylindrical chamber comprising first and second co-axial cylindrical portions 9a, 9b, through which the connection element 6 extends. The end portion 6b of the element 6 is partially threaded for engagement with a nut 10 which serves to connect the element 6 to the annular element 7.

The connection element 6 is provided with an axial hole 6c the purpose of which will become clearer below, and with a pair of opposite radial holes 6d which serve as seats for two transverse pins 11 the ends of which project radially outwardly from the said holes 6d. The function of the said pins 11 will also be described below.

Figure 4:
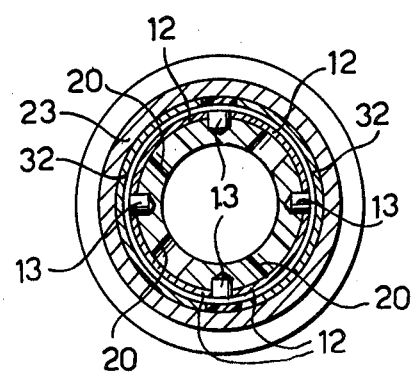
FIG. 4 is a transverse section taken on the line IV—IV of FIG. 2.
Figure 3:
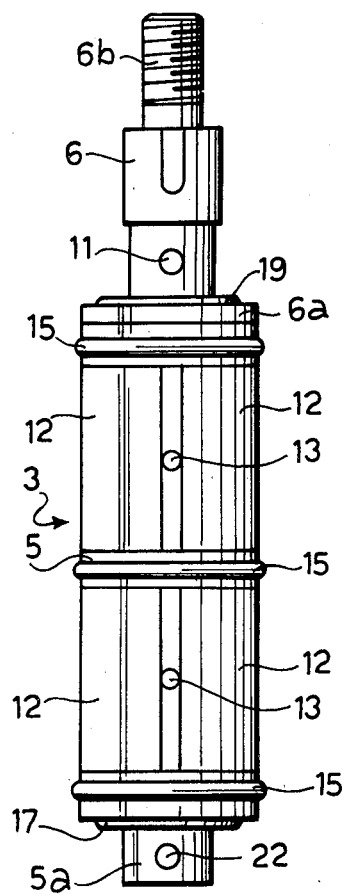
FIG. 3 is a perspective view of a cylindrical body of the transducer of FIG. 1.

The lateral surface of the hollow cylindrical element 5 includes a first and a second axial portion each provided with four equi-angularly spaced metal plates 12 positioned diametrically opposite to one another in pairs (FIGS. 3 and 4).

As is illustrated in FIGS. 3 and 4, between two adjacent metal plates 12 there is provided a pin 13 carried by the hollow cylindrical element 5 to facilitate the positioning of the metal plates 12 on the lateral surface of the said hollow cylindrical body 5 during assembly.

The pins 13 can be made of metal material in which case their side surfaces would be covered with a thin layer of electrically insulating material, obtained, for example, by means of oxidation.

The surface of the hollow cylindrical body 5 is provided with three annular grooves 14 in which are received respective toroidal rings 15 of elastomeric material which cooperate with the inner surface of the casing 4 and serve as resilient spacer elements.

The hollow cylindrical element 5 also has an annular groove 16 in its lower end surface. A toroidal ring 17 of elastomeric material is received in this groove. The upper surface of the annular flange 6a of the connection element 6 is also provided with an annular groove 18 receiving a toroidal ring 19 of elastomeric material.

The wall of the hollow cylindrical element 5 is provided, in correspondence with each metal plate 12, with a hole 20 through which extends a respective electrical conductor 21 having one end soldered to a corresponding metal plate 12. The conductors 21 extend through the holes 6c of the connection element 6 and then pass out from the end of the movable arm 2 through a hole 2a. The hollow cylindrical body 5 has a cylindrical end projection 5a provided with a diametral hole 5b in which there is inserted a pin 22 the ends of which project radially outwardly from the said projection 5a. The purpose of the pin 22 will be described below.

Figure 5:
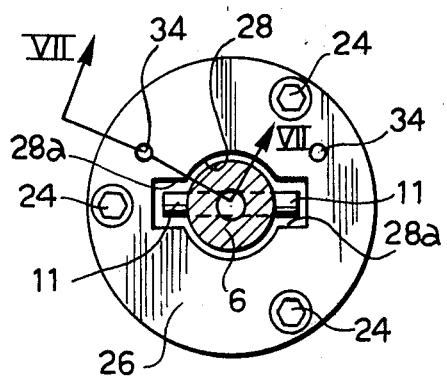
FIG. 5 is a transverse section taken on the line V—V of FIG. 2.

The hollow cylindrical element 5 can be made of an electrically insulating material having a considerable mechanical rigidity. The casing 4 includes a cylindrical sleeve 23 to the ends of which there are connected, by means of screws 24 and 25, respective closure elements 26 and 27 (FIG. 2). The closure element 26 has a circular cylindrical hole 28 (FIG. 5) through which the connection element 6 extends. The sides of the said hole 28 are formed with two diametrically opposite recesses 28a into which extend the ends of the said pins 11 carried by the connection element 6.

A washer 29 is located around the connection element 6 above the flange 6a of the said connection element. The lower surface of the washer 29 cooperates with the toroidal ring 19 of elastomeric material serving as the resilient spacer element. A washer 30 is located around the lower projection 5a of the hollow cylindrical body 5 and seats on the closure element 27. The upper surface of the said washer 30 cooperates with the toroidal ring 17 of elastomeric material carried at the lower end of the hollow cylindrical body 5 and serving as the resilient spacer element.

Figure 6:
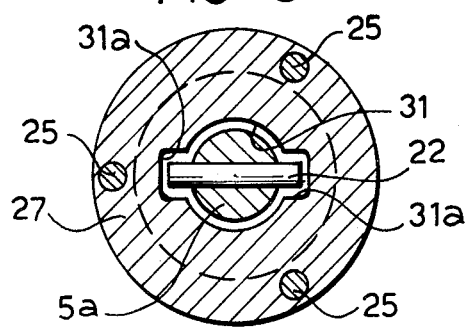
FIG. 6 is a transverse section taken on the line VI—VI of FIG. 2.

The lower closure element 27 is provided with an axial cylindrical chamber 31 (FIG. 6). The cylindrical projection 5a of the said hollow cylindrical element 5 extends into a first portion of the said cylindrical chamber 31. The wall of this first portion of the chamber 31 is formed with two diametrically opposite recesses 31a into which extend the ends of the pin 22 carried at the lower end of the hollow cylindrical body 5.

The chamber 31 also includes a second cylindrical portion 31b (FIG. 2) threaded for the purpose which will be described below. The side surface of the closure element 27 is partially threaded for the purpose which will be described below.

The inner surface of the sleeve 23 is provided with two substantially semi-cylindrical metal plates 32, equi-angularly spaced from one another and located facing the plates 12 carried by the hollow cylindrical body 5 in such a way as to define therewith a narrow interspace and to constitute eight capacitors the capacitance of which depends on the positions of the said plates 32 of the casing relative to the plates 12 of the body 5.

The sleeve 23 may be made of an electrically insulating material which has a significant mechanical rigidity. It can also be covered on its outer surface with a conductor element for screening.

Figure 7:
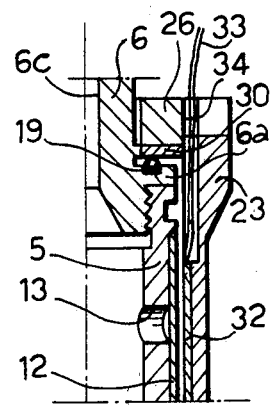
FIG. 7 is a sectional view taken on the line VII—VII of FIG. 5.

An electrical conductor 33 (FIG. 7) is connected to each of the said plates 32. Each conductor 33 passes out of the casing 4 through a respective hole 34 (FIGS. 5 and 7) of the closure element 26 of the casing 4. The casing 4, constituted by the sleeve 23 and the closure elements 26, 27 is resiliently suspended on the body 3 (constituted by the hollow cylindrical body 5 and by the connection element 6) by means of the toroidal rings 15, 17 and 19 functioning as resilient spacers. The casings 4 can perform limited displacements with six degrees of freedom with respect to the body 3.

The washers 29 and 30 respectively, cooperate with the toroidal rings 19 and 17 to limit the axial displacements of the casing 4 with respect to the body 3. The ends of the pins 11, 22 which extend with play into the recesses 28 and 31a respectively, limit the angular displacements of the casing 4 with respect to the body 3.

The effect of forces or moments applied, during use, to the movable arm 2 through the transducer 1 according to the invention are converted into variations of the capacitance of at least some of the said eight capacitors constituted by the plates 12 carried by the hollow cylindrical element 5 and by the plates 22 carried by the sleeve 23. These capacitance variations can arise both due to the variation of the facing surface areas of each plate 12 and the facing plate 32, and by variations in their separation.

In FIG. 8 there are schematically illustrated detector means connected to the plates 12 of the body 3 and to the plates 32 of the casing 4, for measuring, during operation, the values of the capacitance of each of the said capacitors and for providing, on the basis of this measurement, electrical signals indicative of the forces and the moments applied to the movable member constituted by the movable arm 2 of a robot. In this Figure the plates carried by the body 3 have been indicated 12a, 12b, 12c, 12d, 12e, 12f, 12g and 12h, and the plates carried by the casing 4 have been indicated, respectively, 32a and 32b for greater clarity in the following discussion.

An orthogonal cartesian reference system OXYZ has been introduced into FIG. 8, the Z axis coinciding with the axes of the concentric circular cylindrical surfaces of which the plates 12 and 32 form part, the X axis being directed perpendicularly with respect to two corresponding pairs of opposite plates and passing through the center of these plates, and the Y axis being directed perpendicularly to the Z and X axes.

The plates 32a and 32b are both earthed.

Eight voltage-to-frequency converters have been indicated with the reference numerals 35 to 42, these being driven by a single oscillator 43. As is known, a voltage-to-frequency converter can be conveniently used as a capacitance measuring instrument. A voltage-to-frequency converter device which has been found to be particularly suitable for the purpose is constituted by the integrated circuit known commercially by the reference LM 2907 produced by National Semiconductors.

Each of the voltage-to-frequency converters 35 to 42 is connected to an associated capacitor constituted by one of the plates 12 and the facing portion of a corresponding plate 32. The converters 35 to 42 provide at their output a voltage signal the amplitude of which is proportional to the capacitance the corresponding capacitor to which they are connected respectively. The output voltages of the converters 35 to 42 will in the following description be indicated respectively $V_1, V_2 \ldots V_8$ (FIG. 3).

Now supposing that there is applied to the casing 4 a force directed in the negative sense along the X axis (FIG. 8). This force causes a translation of the casing 4 with respect to the inner body 3 such that the distance between the plates 12a, 12c and the plate 32a diminishes, whilst the distance between the plates 12b, 12d and the plate 32b increases. Correspondingly, the capacitance of the capacitors constituted by the plates 12b, 12d and 32a, increases, whilst the capacitance of the capacitors constituted by the plates 12a, 12c and 32b diminishes. Consequently the voltages $V_1$ and $V_5$ provided at the outputs of the converters 35 and 39 respectively increase, and the voltages $V_4$ and $V_8$ provided, respectively, at the outputs of the converters 38 and 42 diminish.

It is therefore apparent that the quantity $$(V_1-V_4)+(V_5-V_8)$$

is indicative of the relative displacement of the casing 4 with respect to the inner body 3 due to the effect of a force acting along the X axis.

On the basis of similar considerations to those given above, it can be determined that the quantity $$(V_2-V_3)+(V_6-V_7)$$

is indicative of the amount of translational movement of the casing 4 with respect to the inner body 3 due to the effect of a force acting along the Y axis.

Moreover, the quantities $$(V_2-V_3)-(V_6-V_7)$$

and $$(V_1-V_4)-(V_5-V_8)$$

are indicative of the amount of relative rotation of the casing 4 with respect to the inner body 3 due to the effect of moments acting respectively about the X axis and the Y axis.

Now supposing that a force acting parallel to the Z axis for example in the positive direction of this axis, is applied to the casing 4.

The effect of this force is to cause an axial translation of the plates 32 with respect to the eight plates 12. As a consequence of this translation the capacitance of the four capacitors constituted by the plates 12a, 12b, 12e, 12f and by the facing portions of the plates 32a, 32b increase due to the increase of the overlapping surfaces. Contemporaneously, the capacitance of the capacitors constituted by the plates 12c, 12d, 12g, 12h and the facing portions of the plates 32a, 32b falls due to the reduction in the overlapping surface area of these plates.

On the other hand whenever the force acting on the casing 4 is directed parallel to the Z axis but in the negative sense the capacitances of the capacitors including the plates 12c, 12d, 12g, 12h increase and the capacitances of the capacitors including the plates 12a, 12b, 12f, 12e diminish.

Whatever the direction of the force acting on the casing 4 parallel to the axis Z, the quantity (for example)

$$(V_1-V_5)+(V_4-V_8)$$

is indicative of the magnitude and direction of the relative displacement between the casing 4 and the inner body 3 along the Z axis consequent on the application of a force acting on the casing 4 parallel to the Z axis, and so, therefore, this quantity is also indicative of the magnitude and direction of this force.

Obviously, for the purpose of establishing a relation between the variation in capacitance of the said eight capacitors and the magnitude and direction of a force acting parallel to the Z axis, it is necessary that the circles respectively defined by the upper edges of the plates 12a, 12b, 12e, 12f (FIG. 8) and by the lower edges of the plates 12c, 12d, 12g, 12h (FIG. 8) should lie in respective planes which do not intersect the plates 32a, 32b.

Now supposing that a moment acting about the Z axis, for example in an anti-clockwise sense is applied to the casing 4. Due to the effect of this moment, the capacitances of the capacitors including the plates 12e, 12f, 12g, 12h fall as a result of the reduction in the areas of the portions of the plates 32a, 32b which overlap these plates. Contemporaneously the capacitances of the capacitors including the plates 12a, 12b, 12c, 12d increase due to an increase in their areas of overlap with the plates 32a, 32b.

In the case of a moment acting on the casing 4 about the Z axis in the clockwise sense, the increases and decreases in the capacitances are inverted with respect to the case described above of a moment acting in the anti-clockwise sense.

In either case the quantity $$(V_1-V_2)+(V_4-V_3)$$

is indicative of the magnitude and direction of the relative rotation between the casing 4 and the inner body 3 following the application to the casing 4 of the moment acting about the Z axis, and therefore this quantity provides information both as to the magnitude and the direction of this moment.

Naturally, in order to render the relation between the instantaneous values of the capacitances of the capacitors, and the magnitude and direction of the forces applied to the casing 4 unambiguous, it is necessary that each of the plates 12 carried by the inner body 3 cannot in any circumstances simultaneously overlap both the plates 32 carried by the casing 4. It is to prevent the occurrence of such a situation that the pins 11, 22 (FIGS. 5,6) are provided. Because these pins can rotate with a limited play in the associated recesses 28a, 31a, they place a limitation on the angular displacements of the casing 4 with respect to the inner body 3.

In FIG. 8 there are generally indicated, with the reference numeral 44, processing means for processing the signals generated by the converters 35 to 42, and for providing signals indicative of the components of the forces and the moments along the X, Y and Z axes applied to the casing 4 and consequently transmitted to the arm 2 by means of the inner body 3.

The said processor means 44 include, for example, ten differential amplifiers 45 to 54 and four analogue summing circuits 55 to 58. The connections between the inputs of the differential amplifiers 45 to 52 and the outputs of the converters 35 to 42, as well as the connections between these differential amplifiers and the summing circuits 55 to 58 and the differential amplifiers 53,54, constitute the direct circuit equivalent of the six above-described relations between the voltages provided at the outputs of the converters 35 to 42 and the components along the axes X, Y, Z of the forces and the moments applied to the casing 4 and transmitted to the movable arm 2 by means of the inner body 3.

In particular, at the output terminals of the summing circuits 55, 56 and 57 there are, in use, available voltage signals indicative of the components along the axes X, Y, Z respectively of the forces applied to the casing 4.

At the output terminals of the differential amplifiers 53, 54 and the summing circuit 58 there are, in use, available voltage signals indicative of the components along the axes X, Y, Z respectively of the moments applied to the said casing 4.

Conveniently, a device according to the invention can constitute the handle for manual control of the movable arm 2 of a robot during the teaching phase. In this case the signals provided at the output of the processor means 44 can be utilized by the central processor of the robot in such a way as to allow a minimization of the forces and moments applied to the handle in making the arm of the robot follow the particular path through space that the arm 2 of the robot is intended to follow subsequently when the robot is working.

Alternatively, at the lower end of the casing 4 of the device according to the invention there can be connected a working tool, and in this case the device according to the invention can operate as a sensitive wrist able to detect the stresses to which the working tool is subjected during working.

Naturally, the principle of the invention remaining the same, the embodiments can be widely varied with respect to what has been described and illustrated purely by way of non-limitative example, without by this departing from the scope of the present invention.

We claim:

1. A transducer having six degrees of freedom, for converting the forces and moments applied to a movable member, particularly to the movable arm of a robot, into electrical signals, said transducer comprising
   a rigid body of substantially cylindrical form intended to be connected to the said movable member, said body having a lateral surface which comprises a first and a second axial portion;
   a respective set of four metal plates provided on each of said first and second axial portions of said body, the plates of each set being equi-angularly spaced around the body and being arranged diametrically opposite one another in pairs, the generatrices of the said lateral surface which are tangential to each plate carried by the said first axial portion of the said surface, being tangential to a corresponding plate carried by the said second portion;
   a rigid casing having a substantially cylindrical inner surface which surrounds the said body;
   resilient spacer means resiliently mounting said casing on the said body in such a way that the casing can perform limited displacements with six degrees of freedom with respect to the body;
   two substantially semi-cylindrical equi-angularly spaced metal plates provided on the inner surface of said casing, said semi-cylindrical plates being positioned facing the plates carried by the said body in such a way as to define therewith a narrow interspace and to constitute eight capacitors the capacitances of which depend on the relative positions between the plates of the casing and the plates of the body; and
   detector means connected to the said capacitors for measuring, in use, the instantaneous values of the capacitance of each of the said capacitors and for providing, on the basis of this measurement, electrical signals indicative of the forces and the moments applied to the said movable member.

2. A transducer according to claim 1, wherein the said lateral surface and the end surfaces of said body each have at least one annular groove formed therein, said resilient spacer means being constituted by toroidal rings of elastomeric material lodged in the said annular grooves of the body and cooperating with the inner surfaces of the casing.

3. A transducer according to claim 1 or 2, wherein said body is provided at each end with at least one radial projection, said casing being formed with a recess in correspondence with each said projection, and the projections extending into said recesses such as to limit the angular displacements of the casing with respect to the body.

4. A transducer according to claim 2, wherein the casing is provided at each end with a wall extending radially from its inner surface and facing towards a corresponding end surface of the body; the said radial walls of the casing cooperating with the said toroidal rings lodged in the grooves of the said end faces of the body to limit the axial displacements of the casing with respect to the body.

5. A transducer according to claim 4, wherein each of the said two radial walls is constituted by an annular wall.

6. A transducer according to claim 1, wherein the casing constitutes a handle for manual control of the movable arm of a robot during the teaching phase.

7. A transducer according to claim 1, wherein the casing has at its end which, in use, is opposite the movable arm of the robot, means for connecting a working tool thereto.

8. A transducer according to claim 1, wherein the said detector means include:

eight voltage-to-frequency converters each connected to a respective said plate of the said body, said converters having an associated controlling oscillator which is common to all the converters, and each of the said converters providing output signals the voltage of which is proportional to the capacitance of the corresponding said capacitor; and processor means for processing the signals emitted by said converters to provide signals indicative of the forces and the moments applied to the casing, and therefore to the movable member by means of the said body.

* * * * *